Fig. 1.

Aug. 2, 1938.   H. W. SCHNEIDER ET AL   2,125,837
TUMBLER FEEDING MECHANISM
Filed April 19, 1937   6 Sheets-Sheet 4

INVENTORS
H. W. Schneider,
L. O. Mankin
BY Rule & Hoge
ATTORNEYS

Patented Aug. 2, 1938

2,125,837

UNITED STATES PATENT OFFICE 2,125,837

TUMBLER FEEDING MECHANISM

Henry W. Schneider and Lawrence O. Mankin, Toledo, Ohio, assignors to Libbey Glass Company, a corporation of Ohio Application April 19, 1937, Serial No. 137,716

19 Claims. (Cl. 101—124)

The stenciling apparatus comprising the present invention is primarily adapted for use in applying a vitreous enamel composition or paint to articles of glassware such as tumblers, bottles, jars and the like and to other articles of a vitreous or ceramic nature in the lettering or decorating thereof by a stenciling process.

The principal object of the invention is to provide a fully automatic apparatus which will generally improve and simplify the operation of applying the vitreous enamel composition to such articles; which will materially increase the quantity of work performed as well as improving the quality and uniformity thereof; and which will eliminate the necessity of employing skilled labor otherwise required in performing the same type of stenciling operations.

The invention is embodied in an apparatus of the type employing a stencil screen capable of movement relative to the article undergoing decoration and having permeable portions representing the design to be applied to the article through which the enamel is transferred to the article by the spreading action of a squeegee. A further object of the invention is to provide an apparatus of the type just mentioned in which tumblers or other articles undergoing decoration are automatically fed to the apparatus, are conducted by and oriented in the apparatus to a decorating station in proper position for cooperation with a stencil screen and squeegee assembly by means of which the articles are automatically lettered or decorated and are released by the stencil screen for removal from the apparatus.

The apparatus involves in its general organization a lower platform or table 20 including vertically extending longitudinal side plates 21 and 22 and vertically extending end plates 23 and 24. The table 20 is provided with supporting legs 25 forming a part of the framework of the apparatus.

TUMBLER FEEDING MECHANISM

Figure 2:
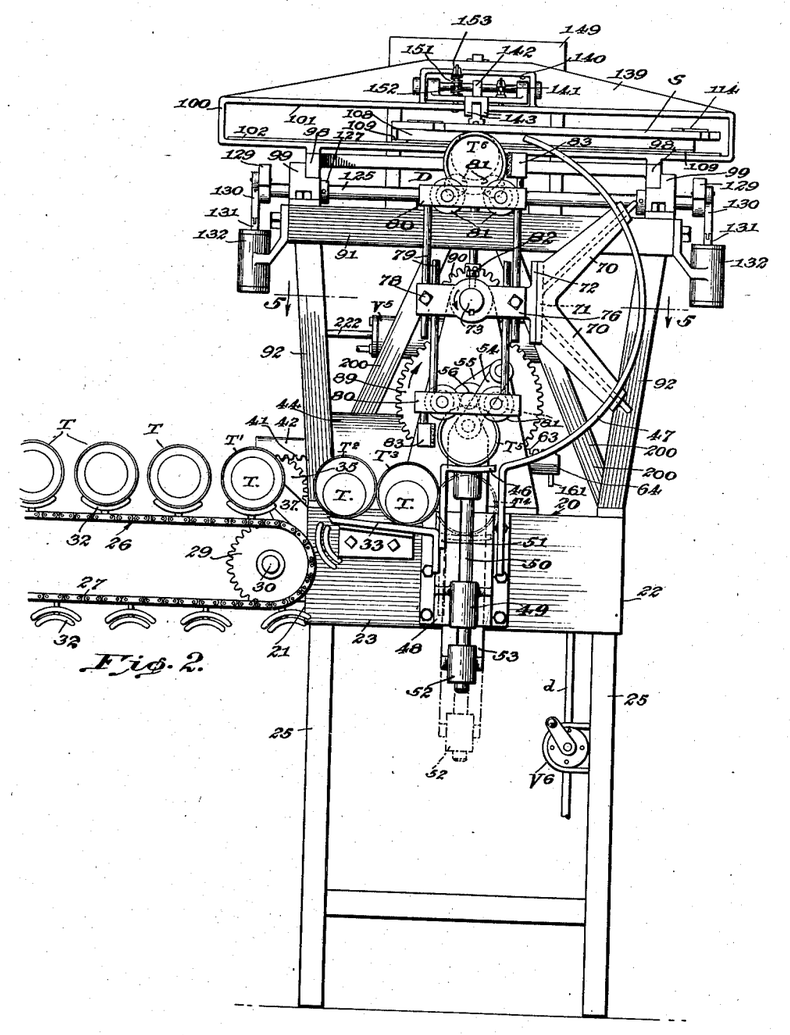
Fig. 2 is a front elevational view of the stenciling apparatus.
Figures 3, 4, 5:
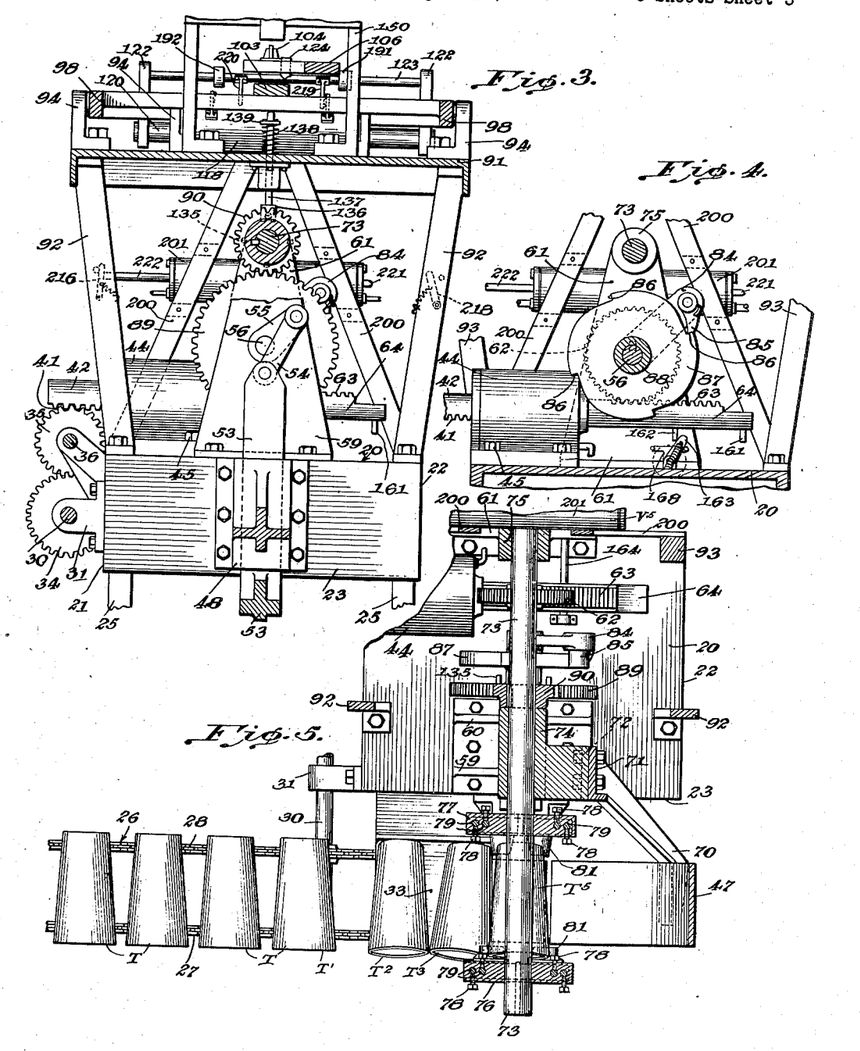
Fig. 3 is a sectional view taken substantially along the line 3—3 of Fig. 1.
Fig. 4 is a sectional view taken substantially along the line 4—4 of Fig. 1.
Fig. 5 is a sectional view taken substantially along the line 5—5 of Fig. 2.
Figure 11:
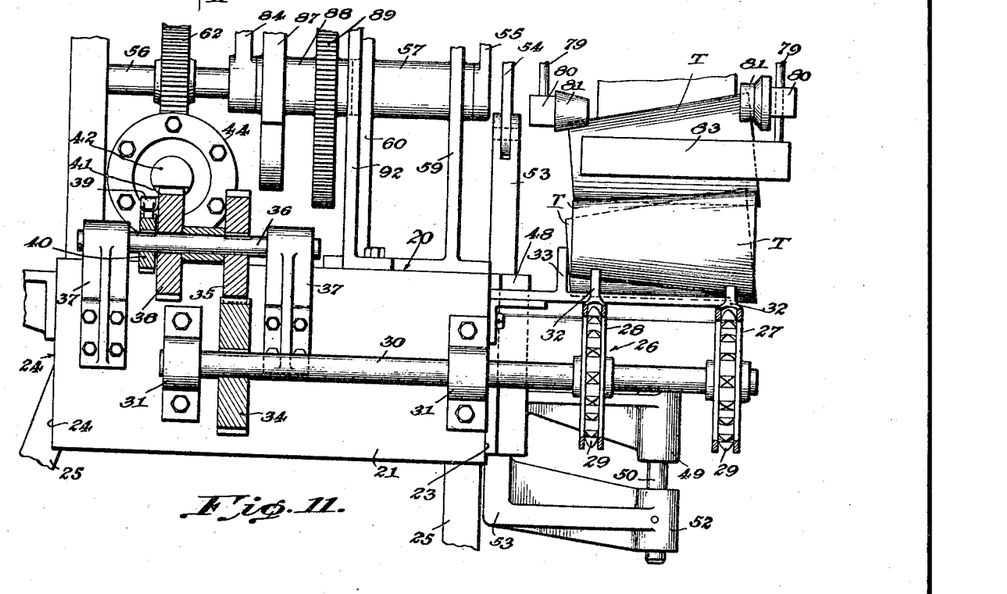
Fig. 11 is a sectional view taken substantially along the line 11—11 of Fig. 10.

Referring now to Figs. 2, 5 and 11, an endless conveyor is designated at 26 and consists of a pair of conveyor chains 27 and 28 which are supported at one end of the conveyor adjacent the apparatus on a pair of conveyor wheels 29 mounted on a horizontal shaft 30 supported in bearings 31 mounted on the side plate 21. A series of tumbler supports 32 are carried by the chains 27 and 28 and are designed to support thereon the tumblers T to be fed to the apparatus. Secured to the end plate 23 adjacent the dipping end of the conveyor 26, is an incline or runway 33 upon which the tumblers T are deposited in a cumbent position from the dipping end of the conveyor. The incline or runway 33 is of sufficient length to accommodate but two tumblers at a time, and thus the arcuate path travelled by the tumblers in rolling down the surface of the incline, 33 may be kept well within the confines of the latter.

Figure 10:
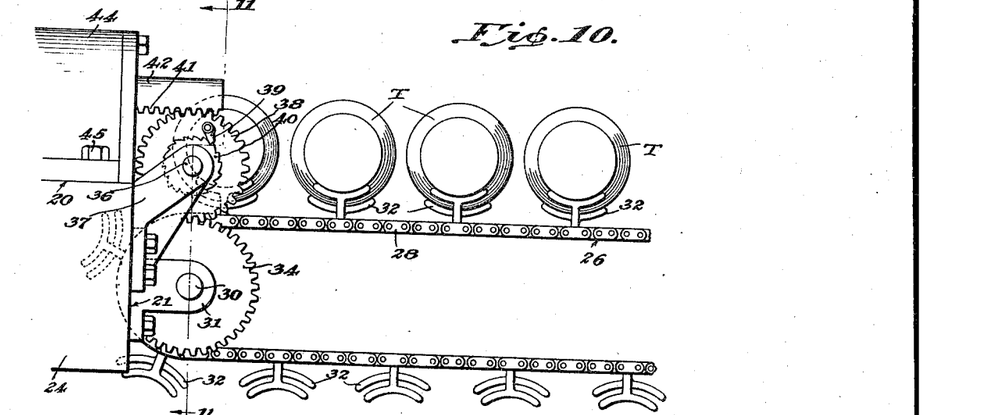
Fig. 10 is an enlarged fragmentary rear elevational view of a portion of the apparatus illustrating the manner in which an article conveyor employed for feeding the apparatus is actuated.

The tumbler supporting conveyor 26 which forms a part of the tumbler feeding mechanism is adapted to be periodically indexed in synchronism with other operating instrumentalities of the apparatus in order that the tumblers T may be fed one at a time to the incline 33. Toward this end, the conveyor shaft 30 (Figs. 10 and 11) is provided with a gear 34 which meshes with a similar gear 35 mounted on a jack shaft 36 rotatably supported in bearings 37 secured to the face plate 21. A gear 38 loosely mounted on the shaft 36 carries a pawl 39 which engages a ratchet wheel 40 keyed to the shaft 36. The gear 38 is in constant mesh with a toothed rack 41 formed on a normally retracted plunger 42 connected to a piston 43 (Fig. 12) which is reciprocable in a cylinder 44 which is bolted or otherwise secured as at 45 (Fig. 4) to the table 20. Thus it will be seen that upon reciprocation of the piston 43 in the cylinder 44, the oscillatory motion of the gear 38 will intermittently be transmitted through the ratchet and pawl mechanism 40, 39, jack shaft 36, and gears 34 and 35 to the conveyor shaft 30 which will be periodically indexed to cause the conveyor 26 to deposit the tumblers T one at a time onto the incline 33.

TUMBLER RECEIVING AND ELEVATING MECHANISM

Figure 1:
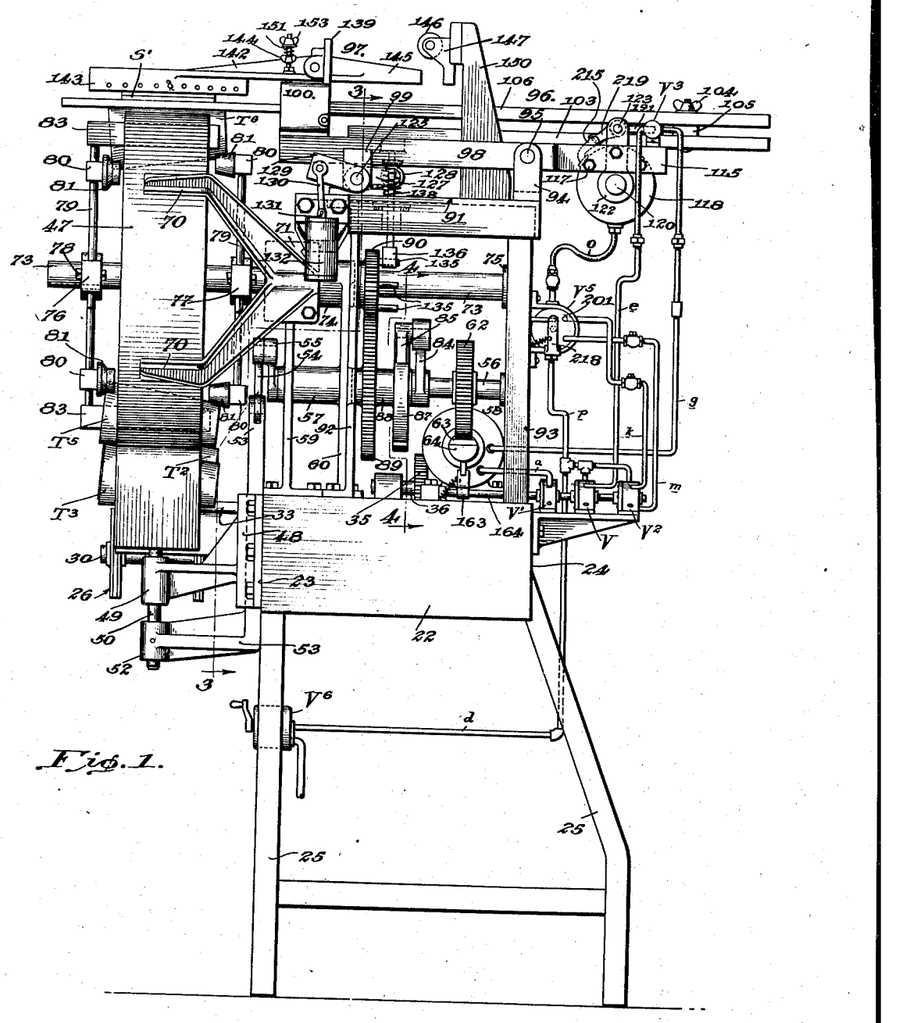
Fig. 1 is a side elevational view of a stenciling apparatus manufactured in accordance with the present invention.

From the incline 33, the tumblers T are adapted to be successively received upon a tumbler support 46 (Fig. 2) by means of which they are given an initial lift into alignment with a circular arcuate track 47, forming a part of a tumbler orienting mechanism subsequently to be described, and by means of which they are elevated and positioned against the underneath side of a stencil screen S, forming a part of a decorating assembly likewise to be described, in operative decorating relation with respect thereto. Toward this end, the end plate 23 has secured thereto a bracket 48 (Figs. 2 and 3) carrying a bearing 49 in which there is mounted for vertical reciprocation a rod 50 having mounted at its upper end the tumbler support or lift 46 which is in the form of an arcuate supporting plate having a depending abutment plate 51 formed thereon against which the foremost tumbler T on the incline 33 is adapted to bear prior to its removal from the latter. The lower end of the rod 50 is anchored in a bracket 52 formed on a slide 53 which is vertically slidable in the bracket 48 and the upper end of which is pivotally secured to one end of a link 54, the other end of which link is pivotally secured to a crank arm 55 mounted on a horizontal rock shaft 56 which is mounted for rocking movement in bearings 57 and 58 (Fig. 1). The bearing 57 is integrally formed on and supported by a pair of standards 59 and 60, while the bearing 58 is formed on an upright support 61, all of which standards are mounted upon the table 20.

The rock shaft 56 has secured thereto adjacent the rear end thereof a gear 62 which meshes with a toothed rack 63 provided on a plunger 64 secured to the piston 43 (Fig. 12) which is mounted in the cylinder 44 (Fig. 1) previously referred to. Thus it will be seen that reciprocation of the piston 43 in the cylinder 44 will impart rocking movement to the rock shaft 56, thus causing vertical reciprocation of the rod 50 and tumbler support 46 thereon through the medium of the crank arm 55, link 54 and slide 53. As the rod 50 assumes its lowermost position as shown by the dotted lines in Fig. 2, the abutment plate 51 will be lowered out of the path of movement of the foremost tumbler T on the incline 33, while the tumbler lift 46 will occupy a position below the level of the incline, thus permitting the foremost tumbler T to move by gravity onto the lift 46. Subsequent upward movement of the lift 46 carries the tumbler T to the full line position indicated.

TUMBLER ORIENTING MECHANISM

When the lift 46 is in its uppermost position, it forms a continuation of the circular arcuate track 47 previously referred to. The runway 47 extends upwardly from the lift 46 and terminates in the vicinity of the stencil screen S. The runway 47 is supported by means of a spider 70 carried by a plate 71 bolted to a face plate 72 formed on the standard 59. The tumblers T are adapted to be individually propelled upwardly on the runway 47 and rotatably supported in operative decorating position in contact with the underneath side of the stencil screen S at a decorating station D during application of the lettering or design to the tapered sides thereof. Toward this end, a horizontal shaft 73 (Figs. 1 and 2) is supported in bearings 74 and 75, the former of which is integrally formed on and supported by the standards 59 and 60, and the latter of which is formed on the support 61. The shaft 73 extends forwardly of the arcuate runway 47 and has keyed thereto at spaced points therealong, front and rear hub members 76 and 77 which are substantially identical in formation. Extending through each hub member and adjustable therein by means of set screws 78 are two pairs of supporting rods 79, the pairs extending in opposite directions. The free ends of each pair of rods 79 support therebetween a tumbler supporting rack 80 and each rack is provided with a pair of spaced article supporting rollers 81. The outer rollers, i. e., the rollers which are supported from the front hub 76, are designed to support therebetween the rim portion of a tumbler to be decorated, while the inner rollers 81 which are supported from the rear hub 77 are designed to support therebetween the base portion of the tumbler. The longitudinal distance between the respective pairs of rollers 81 may be varied to compensate for differences in the lengths of various tumblers to be decorated, and accordingly, the hubs 76 and 77 are longitudinally adjustable on the shaft 73 by means of set screws 82.

The supporting rods 79 normally occupy a vertical position with either rack 80 positioned directly below the shaft 73 and at an elevation whereby the rollers 81 carried thereby are engaged by the tumbler T supported on the elevated lift 46. Each rack is provided at one side thereof with a tumbler impeller 83 which, when the rack 80 is in its lower position, depends therefrom on one side of the tumbler for the purpose of impelling the same upwardly on the arcuate runway 47 into decorating position when the shaft 73 is periodically indexed throughout an angle of one hundred and eighty degrees as will be described presently. During the upward movement of the tumbler T on the runway 47, the side of the tumbler bears against the impeller 83 and is confined between the rollers 81 and the runway 47. In the upper regions of the runway, the tumbler comes to rest on the rollers 81. As the tumbler leaves the upper end of the runway, it engages the stencil screen S, and when the shaft 73 has been completely indexed, the tumbler is rotatably supported on the rollers 81 at the decorating station D in tangential rolling line contact with the stencil screen S.

In order to periodically index the shaft 73 and thus impel the tumblers T upwardly in the manner just described, a crank arm 84 (Figs. 1 and 4) is mounted on the shaft 56 and is provided with a pawl 85 adjacent its outer end. The pawl 85 is adapted to successively engage each of four teeth 86 provided on a ratchet wheel 87 which is formed on a sleeve 88 that is loosely mounted on the shaft 56. Integrally formed on the sleeve 88 is a gear 89 which meshes with a gear 90 which is keyed to the shaft 73. Thus it will be seen that as the piston 43 (Fig. 12) reciprocates in the cylinder 44, periodic indexing of the shaft 73 will occur, motion being periodically imparted thereto through the rack 63, gear 62, shaft 56, crank arm 84, pawl and ratchet mechanism 85, 86, 87, and gears 89 and 90. Such indexing of the shaft 73 will cause the tumblers T to be oriented and brought into contact with the underneath side of the stencil screen S in synchronism with their reception by the tumbler support or lift 47.

THE DECORATING INSTRUMENTALITIES

*Supporting framework*

Referring now to Figs. 1, 3, 5 and 6, the decorating instrumentalities of the apparatus include an upper table 91 which is supported upon a pair of front standards 92 and a pair of rear standards 93, which standards are bolted to the lower table 20. A pair of upright supports 94 are bolted to the table 91 and extend upwardly from the rear corners thereof and serve to support therebetween a transverse horizontal rock shaft 95. The rock shaft 95 extends across the rear edge of the table 91, is substantially coextensive therewith, and rockably supports the inner or rear edge of a stencil screen assembly 96. A squeegee assembly 97, including a squeegee S', is operatively supported upon and carried by the stencil screen assembly 96.

*Stencil screen assembly*

The stencil screen assembly 96 includes a forwardly extending frame 98 of generally rectangular shape. The side portions of the frame 98 normally rest upon and are supported by a pair of bearing blocks 99 which will be subsequently referred to. Bolted or otherwise secured to the frame sides at the forward ends thereof is a relatively heavy casting 100, generally of rectangular formation, provided with an elongated transversely extending opening 101 (Fig. 2), across the bottom of which extends a slideway 102, the purpose of which will appear presently. A supporting beam 103 is secured to the upper side of the frame 98 and extends rearwardly of the machine, passing over the rock shaft 95. Pivoted to the beam 103 by means of a nut and bolt assembly 104 adjacent the rear end thereof and spaced therefrom by means of a spacing collar 105, is a forwardly extending radius arm 106 which projects into the rectangular opening 101 in the casting 100. The radius arm 106 is provided with a series or row of aligned apertures 107 in which the nut and bolt assembly 104 is selectively receivable to vary the effective length of the radius arm 106 and the arc through which it may swing about the axis of the pivot. The outer end of the radius arm 106 within the opening 101 carries an elongated crosshead 108, the length of which is somewhat less than the width of the opening 101. A pair of metal runners 109 (Fig. 2) designed for sliding movement on the slideway 102 are secured to the lower surface of the crosshead 108, one at each end thereof. The crosshead 108 is, by virtue of the pivotal connection with the radius arm 106, capable of reciprocation within the rectangular opening 101 throughout an arc, the extent of which is limited by means of a pair of adjustable limit stops 110 carried by the frame 98 and adapted to be engaged alternately by one or the other of a pair of abutments 111 formed on the crosshead 108.

A pair of stencil screen supporting arms 112 (Fig. 6) are secured to the crosshead 108 at opposite ends thereof and project forwardly therefrom and support therebetween a rectangular, horizontally extending, stencil screen frame 113 which is secured in position by means of brackets 114. The screen S, previously referred to, is formed of silk or any other preferred screen material and has impervious portions and pervious portions, the latter representing the design to be stenciled upon the articles. The screen is stretched across the bottom of the frame 113 and is secured thereto in any preferred manner. The screen is adapted upon oscillation of the radius arm 106 and crosshead 108 to move in its own plane in tractional rolling line contact with the tumbler T undergoing decoration.

In order to oscillate the radius arm 106 and the stencil screen assembly carried thereby in the manner just described, the frame 98 is provided with a pair of rearwardly extending cylinder supporting arms 115 and 116 (Figs. 1 and 6) which are bolted as at 117 to the opposite ends of a cylinder 118, hereinafter referred to as the stencil screen reciprocating cylinder. A piston 119 is mounted for reciprocation within the cylinder 118 and a pair of plungers 120 and 121 are attached to the piston 119 and project outwardly from the ends of the cylinder. Positioned above the cylinder 118, and secured at its ends by means of links 122 to the outer ends of the plungers 120 and 121, is an axially slidable actuating bar 123 which follows the movement of the reciprocating piston 119. A pin and slot connection 124 formed between the medial portion of the actuating bar 123 and radius arm 106 imparts reciprocal motion to the latter about the axis of the pivot 104 upon reciprocation of the actuating bar 123.

In order to elevate the stencil screen assembly 96 from contact with the tumbler T undergoing decoration at the decorating station D, the bearing blocks 99, previously referred to, which support the side portions of the frame 98, serve to support therebetween a transversely extending rock shaft 125 which is rockably journalled in the blocks 99. Positioned directly beneath the side portions of the frame 98 and secured by pins 126 to the rock shaft 125 is a pair of levers 127 carrying rollers 128 at their outer ends. Each end of the shaft 125 carries an operating lever 129, the outer ends of which levers are connected by means of links 130 to the movable core 131 of an actuating solenoid 132, the operation of which will subsequently be described. Upon retraction of the core 131 into the casing of the solenoid 132, the levers 129 are depressed, thus elevating the levers 127 and rollers 128, which rollers engage the underneath side of the frame 98 and elevate the same, together with the entire stencil screen assembly.

In order that the frictional contact between the stencil screen and tumbler undergoing decoration at the decorating station may not tend to carry the entire tumbler orienting assembly including the shaft 73, supporting rods 79, and rollers 81 in the direction of movement of the screen S, means is provided for periodically locking the assembly in a fixed position. Toward this end, the gear 90 (Figs. 1 and 3) is provided with four holding pins 135 which project laterally from one face thereof and which are spaced apart equidistantly in adjacent quadrants on the face of the gear. A bifurcated holding detent 136 is mounted on the lower end of a rod 137 which is vertically slidable in the table 91 and is normally held in an elevated position by means of a coil spring 138 which surrounds the rod 137 and bears at opposite ends thereof against the table and a collar 139 respectively. The upper end of the rod 137 is adapted to be engaged by an overlying portion of the tiltable stencil screen assembly when the latter is lowered into operative decorating position to depress the detent 136 and cause the same to engage the uppermost pin 135 on the gear 90 and prevent rotation of the same.

Squeegee assembly

Figure 6:
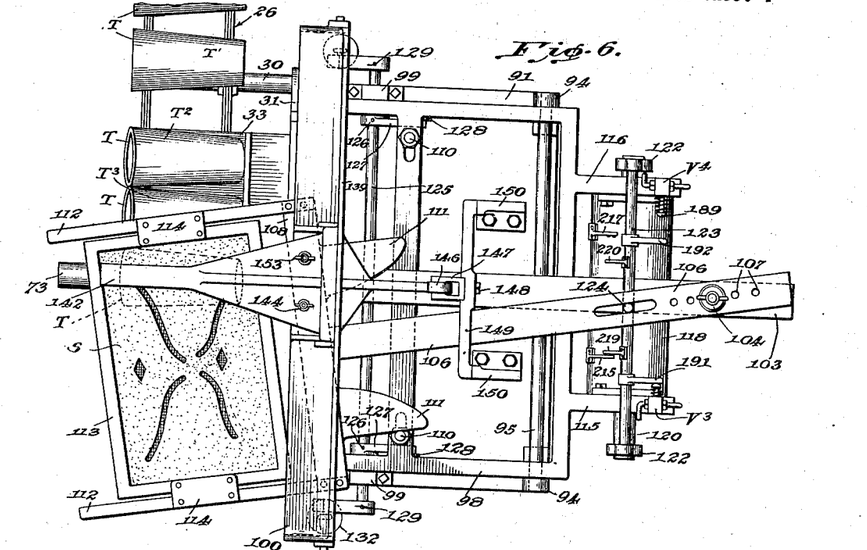
Fig. 6 is a top plan view of the apparatus.

Referring now to Figs. 1 and 6 wherein the squeegee mechanism is best illustrated, the casting 100 is provided with an upstanding flange 139 which extends across the machine and which is provided with a central rectangular opening 140. A rock shaft 141, journalled in bearings in the side walls of the opening 140, extends horizontally across the opening 140 and rockably supports thereon a squeegee carrying arm 142. The forward end of the arm 142 is provided with a pair of downwardly extending parallel flanges 143 (Fig. 2) between which the squeegee unit S' previously referred to is suspended. In order to initially adjust the squeegee unit to the stencil screen S and to regulate the degree of pressure thereon, an adjusting screw 144 passes through the arm 142 and engages the top of the casting 100.

The squeegee supporting arm 142 extends rearwardly of the rock shaft 141 as at 145 and the rear portion thereof is adapted, upon elevation of the stencil screen from the tumbler, to engage a roller 146 which is positioned in its path. The roller 146 is rotatably carried by a bracket 147 which is adjustably secured by a bolt 148 to a cross-bar 149 which is supported at its ends from the upper ends of a pair of standards 150 bolted or otherwise secured to the table 91. Upon engagement of the rear portion 145 of the squeegee supporting arm 142 with the roller 146, the arm 142 is rocked about the axis of the rock shaft 141 in such a manner that the squeegee S' is lifted from the screen S to clear the mass of enamel composition or paint thereon. A coil spring 151 (Fig. 2) centered upon a pin 152 passing through the arm 142 and carried by the casting 100, serves to return the squeegee arm to its operative position in contact with the screen S upon lowering of the stencil screen assembly. A wing nut 153 threaded upon the pin 152 permits adjustment of the tension of the spring 151 and consequently the pressure of the squeegee upon the screen S.

The Stenciling Operation

Without reference to the actual pneumatic or electrical actuating control devices for the operating cylinders 43 and 118 and the solenoids 132, which devices have as yet not been described, the stenciling operation is made by the application of a quantity of a suitable vitreous enamel preparation to the upper surface of the screen S and by movement of the screen bodily in its own plane in one direction or the other across the surface of the tumbler T with which it is in rolling contact. During oscillation of the screen, the stationary squeegee blade S' forces the coloring material through the pervious portions of the screen and onto the surface of the article which is caused to rotate by virtue of its tractional engagement with the screen during movement of the latter. After the decoration has been applied to the tumbler T, and further movement of the screen in the same direction is limited by engagement of one of the abutments 111 with its respective limit stop 110, the levers 127 which carry the rollers 128 are brought into operation upon rocking of the shaft 125 to elevate the stencil screen assembly and cause the screen to be lifted from contact with the tumbler T. The squeegee assembly which is mounted upon the casting 100 of the stencil screen assembly is moved upwardly, and upon contact of the rearwardly extending portion 145 of the squeegee supporting arm 142 with the roller 146, the squeegee is lifted from the screen S and is thus caused to clear the pool of enamel composition on the upper surface of the screen. With the squeegee and stencil screen assemblies thus elevated, access may be had to the decorated tumbler T which is removed manually from the supporting rollers 81.

The Pneumatic Control Instrumentalities

In order to cause reciprocation of the piston 43 in the cylinder 44 (Fig. 12) and perform the indexing operation of the conveyor 26 to deposit the tumblers T one at a time onto the inclined runway 33, the piston is normally maintained in one extreme position in the cylinder by means of a coil spring 160, and means is provided for periodically admitting air under pressure into the cylinder and for exhausting the same.

Figure 7:
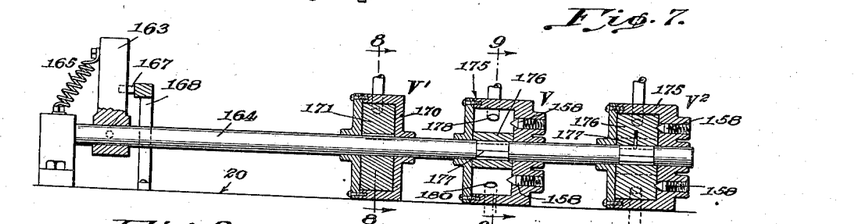
Fig. 7 is a fragmentary sectional view taken longitudinally through a valve shaft employed in connection with the stenciling apparatus.
Figure 12:
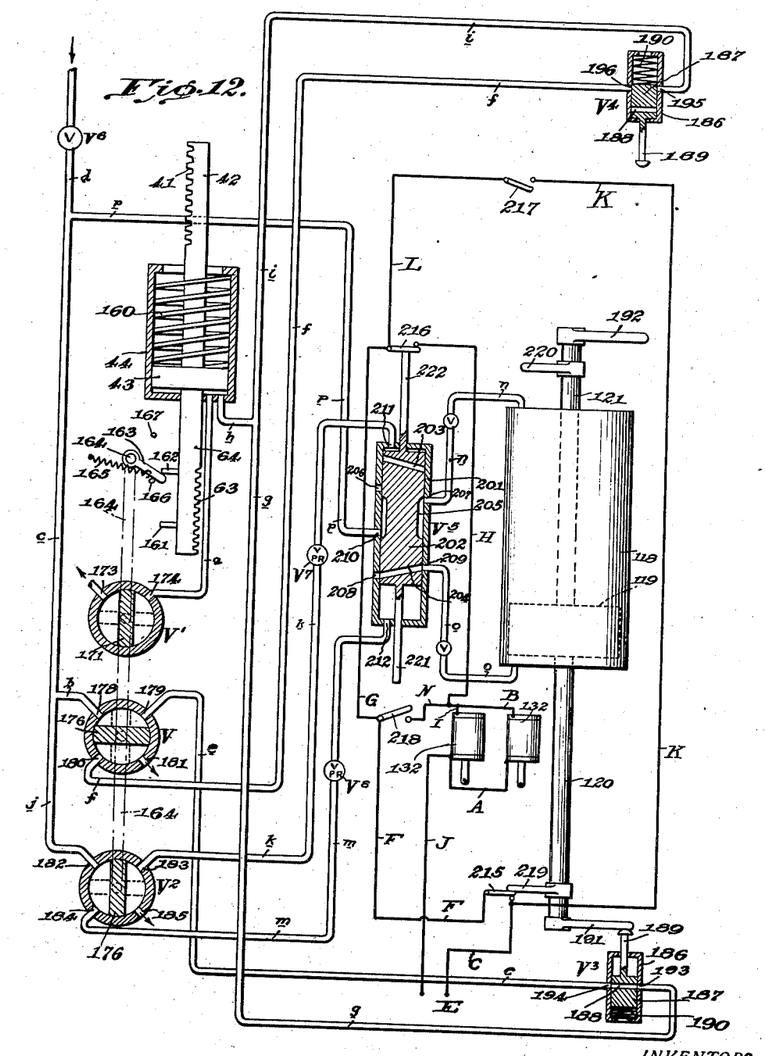
Fig. 12 is a diagrammatic view illustrating the pneumatic controlling mechanism for the apparatus.

Accordingly, the normally projecting plunger 64 which is secured to the piston 43 is provided with a pair of spaced actuating trip fingers 161 and 162 between which there extends the free end of a trip arm 163 mounted on a horizontal rock shaft 164 (Figs. 4, 7 and 12). A coil spring 165 connected to the free end of the trip arm 163 imparts to the arm an unstable degree of equilibrium so that upon tripping of the arm by either of the fingers 161 or 162 upon movement of the plunger 64, the trip arm will occupy a position in contact with one or the other of a pair of limit stops 166 and 167 carried by a bracket 168 bolted to the table 20. An intake valve V, an exhaust valve $V^1$, and a pilot valve $V^2$, the purpose of which latter valve will be described later, are secured in alignment to the table 20, and are adapted to be actuated by the rock shaft 164 which extends through the respective casings of these valves.

Figure 8:
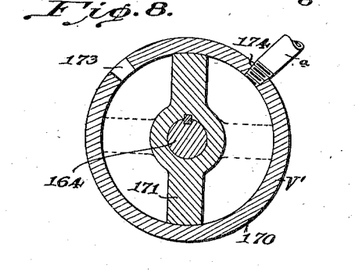
Fig. 8 is a sectional view taken substantially along the line 8—8 of Fig. 7.
Figure 9:
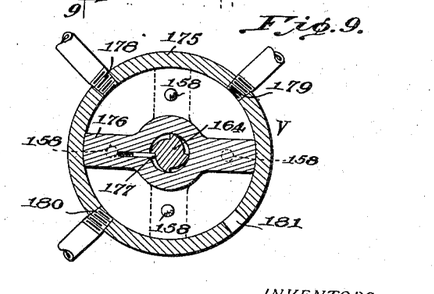
Fig. 9 is a sectional view taken substantially along the line 9—9 of Fig. 7.

The exhaust valve $V^1$ (Figs. 7 and 8) comprises a cylindrical casing 170 in which there is disposed a rotor 171 which is mounted for rocking movement on the shaft 164. The casing 170 is provided with ports 173 and 174. In the full line position of the rotor 171, communication between the ports 173 and 174 is precluded, while in the dotted line position of the rotor, communication between these ports is established.

The intake valve V (Figs. 7 and 8) comprises a cylindrical casing 175 in which there is disposed a rotor 176 which is mounted on the shaft 164 for periodic indexing movement thereof and which is adapted to be periodically indexed upon rocking of the shaft 164 by means of an indexing ratchet and pawl mechanism 177. The casing 175 is provided on one side thereof with ports 178 and 179, and on the other side thereof with ports 180 and 181. In the full line position of the rotor 176, communication between the ports 178 and 179, and between the ports 180 and 181, is established, while in the dotted line position thereof, communication between the ports 178 and 180, and between the ports 179 and 181, is established. In either the full line or the dotted line position of the rotor 176, a pair of locking detents 158 serves to hold the rotor in position.

The pilot valve $V^2$ is substantially identical with the inlet valve V and the same reference numerals are applied to the operative parts thereof. This valve is designed to control the movements of a slide valve $V^5$ which in turn is adapted to control the movements of the piston 119 in the cylinder 118. The casing 175 of the pilot valve $V^2$ is provided on one side thereof with ports 182 and 183 (Fig. 12) and on the other side with ports 184 and 185. In the full line position of the rotor 176, communication between the ports 182 and 184 and between the ports 183 and 185 is established, while in the dotted line position thereof communication between the ports 182 and 183 and between the ports 184 and 185 is established. It is to be noted that the rotors of the inlet valve V and pilot valve V² occupy positions on the shaft 164 at right angles to each other.

Referring now to Figs. 6 and 12, a pair of auxiliary intake valves V³ and V⁴ are mounted on the rearwardly extending supporting arms 115 and 116 respectively of the stencil screen frame 98 and are substantially identical in construction. Each valve comprises a casing 186 in which there is mounted for reciprocation a valve member 187 having a passage 188 extending therethrough. Plungers 189 are secured to the respective valve members 187 and project from the casings thereof and are normally maintained in extended position by means of coil springs 190 disposed within the casings 186. A pair of actuating fingers 191 and 192 are mounted on the reciprocable rod 123. The fingers 191 and 192 are adapted, upon reciprocation of the piston 119 in the cylinder 118, to alternately engage the plungers 189 of the valves V³ and V⁴ respectively to cause the plungers 189 to be moved inwardly of the cylinders to move the valve members against the action of the coil springs 190.

The casing of the valve V³ is provided with a pair of ports 193 and 194 while the casing of the valve V⁴ is provided with similar ports 195 and 196. The ports 193 and 194 and the ports 195 and 196 are normally out of communication but are adapted to be brought into communication by the passage 188 when the respective valve member 187 is moved against the action of the coil spring 190 to its extreme position.

Referring now to Figs. 2 and 12, the slide valve V⁵, which is designed to control the movements of the piston 119 in the cylinder 118, is supported upon a pair of standards 200 which extend between the tables 91 and 20 and includes a casing 201 or cylinder in which there is disposed for longitudinal reciprocation a valve member 202 having transverse passages 203 and 204 extending therethrough. A relatively wide annular groove 205 extends completely around the surface of the valve in the medial regions thereof. The valve casing 201 is provided with a pair of opposed ports 206 and 207 adjacent one end thereof and with a pair of similar ports 208 and 209 adjacent the other end thereof. When the reciprocable valve member 202 is in the position indicated in Fig. 12, communication between the ports 208 and 209 is established through the passage 204 and also communication between the port 207 and a port 210 is established through the groove 205. When the member 202 is in the other extreme position, communication between the ports 206 and 207 is established through the passage 203, while at the same time communication between the ports 209 and 210 is also established. Combined intake and exhaust ports 211 and 212 are provided in the ends of the casing or cylinder 201.

The sole function of the exhaust valve V¹ is to control the exhaust of air pressure from the cylinder 44 and toward this end the port 174 thereof is connected through a pipe section $a$ to the interior of the cylinder. The port 173 thereof is connected directly to the atmosphere.

The primary function of the intake valve V is to control the admission of air pressure to the cylinder 44 and is dependent upon the auxiliary intake valves V³ and V⁴. Toward this end, the port 178 of the valve V is connected through pipe sections $b$, $c$ and $d$ and through a main shutoff valve V⁶ to a source of compressed air (not shown). The port 179 is connected through a pipe section $e$ to the port 194 of the auxiliary intake valve V³. The port 180 is connected through a pipe section $f$ to the port 196 of the auxiliary valve V⁴.

The intake valve V is adapted to perform a secondary function, namely to bleed the pipe sections $e$ and $f$ to the atmosphere when these sections are closed off by the auxiliary valves V³ and V⁴. Accordingly, the port 181 of the intake valve V is connected directly to the atmosphere.

The function of the auxiliary intake valve V³ is to control the admission of air pressure to the cylinder 44 when the piston 119 of the cylinder 118 is in one extreme position. Similarly the function of the auxiliary intake valve V⁴ is to control the admission of air pressure to the cylinder 44 when the piston 119 is in the other extreme position. Toward this end, the port 193 of the valve V³ is connected through pipe sections $g$ and $h$ to the interior of the cylinder 44 while the port 195 of the valve V⁴ is connected through a pipe section $i$ and through the pipe section $h$ to the interior of the cylinder 44.

The sole function of the pilot valve V² is to control the movement of the valve member 202 in the casing or cylinder 201 of the slide valve V⁵. Toward this end, the port 182 of the valve V² is connected through a pipe section $j$, and pipe sections $c$ and $d$ and valve V⁶ to the source of compressed air. The port 183 is connected through a pipe section $k$, having a reducing valve V⁷ interposed therein, to the port 211 provided in one end of the casing 201 of the valve V⁵. The port 184 is connected through a pipe section $m$, having a reducing valve V⁸ interposed therein, to the port 212 provided in the other end of the casing 201 of the valve V⁵. The port 185 is connected directly to the atmosphere.

The sole function of the slide valve V⁵ is to control the movement of the piston 119 in the cylinder 118. Toward this end, the ports 207 and 209 thereof are connected by respective pipe sections $n$ and $o$ to the opposite ends of the cylinder 118. The ports 206 and 208 are connected directly to the atmosphere. The port 210 is connected through a pipe section $p$ and through the pipe section $d$ and valve V⁶ to the source of compressed air.

THE ELECTRICAL CONTROL INSTRUMENTALITIES

Referring now to Fig. 12, the solenoids 132 which cause elevation of the stencil screen and squeegee assemblies 96 and 97 are designed to be actuated simultaneously and are therefore connected in parallel by means of conductors A and B.

The solenoids 132 are adapted to be periodically actuated, each actuation thereof occurring immediately after the stencil screen has completed its decorating stroke in either direction. Means is provided for alternately closing separate circuits through the solenoids 132, the particular circuit employed depending upon the position of the stencil screen at one or the other side of the apparatus. When the stencil screen is in the position indicated in Fig. 6, with the piston 119 in the corresponding position shown in Fig. 12, immediately after the decorating stroke has taken place, an electrical circuit may be applied from a source E of current, through a conductor C, switch 215, conductors F and G, switch 216, conductors H and I, solenoids 132, and a conductor J. When the stencil screen is in the other extreme position, immediately after the decorating stroke has been completed, an electrical circuit may be applied from the source E of current, through the conductor C, a conductor K, a switch 217, conductors L and G, switch 218, conductors N and I, solenoids 132, and conductor J.

The switch 215 is secured to the casing of the cylinder 118 (Figs. 6 and 12) and is positioned in the path of an actuating finger 219 mounted near the outer end of the plunger 120. When the piston 119 reaches one extreme position thereof with the plunger 120 in its extended position, the actuating finger 219 engages and closes the switch 215. Similarly, the switch 217 is secured to the casing of the cylinder 118 and is positioned in the path of an actuating finger 220 mounted near the outer end of the plunger 121. When the piston 119 reaches its other extreme position with the plunger 121 thereof in its extended position, the actuating finger 220 engages and closes the switch 217.

The switch 218 is secured to a stationary part of the apparatus and is positioned in the path of a plunger 221 carried by the valve member 202 of the slide valve V⁵. When the valve member is moved to one extreme position thereof so that the plunger 221 is in its extended position, the end of the plunger engages and closes the switch 218. Similarly, the switch 216 is positioned in the path of a plunger 222 carried by the valve member 202 and is adapted to be closed thereby when the plunger is extended and the valve member is in the other extreme position thereof.

THE OPERATION OF THE APPARATUS

In the operation of the apparatus, the tumblers T are placed upon the tumbler supports 32 (Fig. 10) and the main shutoff valve V⁶ is opened, thus admitting air under pressure to the interior of the cylinder 44 (Fig. 12) from the source of compressed air through the valve V⁶, pipe sections d, c, and b, inlet valve V, pipe section e, auxiliary inlet valve V³, and pipe sections g and h. The piston 43 is thus moved against the action of the coil spring 160 across the cylinder 44, thus actuating the rack and gear mechanisms 38, 41 and 62, 63.

As fully set forth previously, actuation of the rack and gear mechanism 38, 41, causes the conveyor 26 to be indexed, thus depositing the existing tumbler specifically designated at T¹ (Fig. 2) onto the incline or runway 33 where it assumes the position of the tumbler specifically designated at T². Actuation of the rack and gear mechanism 62, 63, causes the rock shaft 56 (Fig. 1) to be oscillated in one direction throughout an angle of ninety degrees, thus lowering the tumbler support 46 and withdrawing the depending abutment plate 51 from the path of the foremost tumbler T³ on the incline 33 and permitting the tumbler to roll by gravity onto the tumbler support 46 to assume the dotted line position indicated specifically at T⁴.

Immediately prior to the lowering of the tumbler support 46, and simultaneous with the rocking movement of the shaft 56, the shaft 73 (Fig. 2) is advanced one hundred and eighty degrees in the direction indicated by the arrow. The specific tumbler T⁵ carried by the tumbler support 46 is engaged by the tumbler impeller 93 and is elevated on the circular arcuate track 47 into decorating position at the decorating station D as indicated by the specific tumbler T⁶.

As the piston 43 in the cylinder 44 (Fig. 12) approaches the end of its stroke against the action of the coil spring 160, the trip finger 161 engages the trip arm 163 and causes the rock shaft 164 to be turned in one direction throughout an angle of ninety degrees, thus altering the respective positions of the rotor 171 of the exhaust valve V¹ and of the rotors 176 of the inlet valve V and pilot valve V² respectively so that they assume the dotted line positions thereof. The piston 43 is immediately returned to its normal position due to the action of the coil spring 160, air escaping from the cylinder 44 through the pipe section a and exhaust valve V¹.

The immediate return of the piston 43 to its normal position causes actuation of the racks 41 and 63 in the opposite direction, thus rocking the shaft 56 throughout an angle of ninety degrees and causing the tumbler support 46 to elevate the tumbler T⁴ resting thereon into alignment with the circular arcuate track 47 to assume the position indicated by the specific tumbler T⁵.

Since the rotors 176 of the valves V and V² are not keyed to the shaft 164 but are merely indexed thereby, these members remain in their ninety degree position of angularity. Compressed air is then admitted to the slide valve V⁵ through the pipe sections d, c, and j, pilot valve V², pipe section k, and reducing valve V⁷, thus causing movement of the valve member 202 slowly across the cylinder 201. Air is simultaneously exhausted from the cylinder 201 through the pipe section m and pilot valve V².

Initial movement of the valve member 202 of the slide valve V⁵ causes the plunger 222 to leave the switch 216 and permit the same to open. The existing circuit through the conductor C, switch 215, conductors F and G, switch 216, conductors H and I, solenoids 132 and conductor J, is broken by the opening of the switch 216, and the solenoids 132 are deenergized, thus permitting the stencil screen and squeegee assembly to be lowered by the action of gravity so that the stencil screen comes into tangential rolling line contact with the tumbler T⁶.

As soon as the valve member 202 of the valve V⁵ reaches its extreme position, compressed air is admitted to the cylinder 118 (Fig. 12) through the pipe sections d and p, slide valve V⁵, and pipe section o. Simultaneously, air is exhausted from the cylinder 118 through pipe section n and slide valve V⁵. The piston 119 is thus caused to move across the cylinder 118, immediately releasing the plunger 189 of the valve V³ and bleeding the entrapped air in the pipe section e to the atmosphere through the valve V. Movement of the piston 119 across the cylinder 118 in the manner just indicated, operates through the pin and slot connection 124 as previously described to cause the stencil screen to be moved in its own plane across the surface of the tumbler T⁶ to decorate the same.

With the valve member 202 in the extreme position other than that shown in Fig. 12, during movement of the piston 119 across the cylinder 118, the end of the plunger 221 closes the switch 218. Thus, when the piston 118 reaches the end of its stroke and the actuating finger 220 closes the switch 217, the circuit through conductors C and K, switch 217, conductors L and G, switch 218, conductors N and I, solenoids 132, and conductor J is completed, thus energizing the solenoids 132 and causing the stencil screen and squeegee assembly to be again elevated.

With the stencil screen and squeegee assembly elevated, the operator is given access to the decorated tumbler T⁶ which is removed from the supporting rollers 81. When the auxiliary inlet valve V⁴ is actuated by movement of the piston 119 across the cylinder 118, another impulse is applied to the cylinder 44 through pipe sections *d*, *c* and *b*, inlet valve V, pipe section *f*, auxiliary valve V⁴ and pipe sections *i* and *h*. The racks 63 and 41 are again indexed in the manner previously described to advance each tumbler carried by the apparatus to the next succeeding position.

As the impulse is applied to the cylinder 118 to perform the various indexing operations previously described, the respective rotors of the valves V and V² are again moved to the position indicated in full lines in Fig. 12, while the rotor of the valve V¹ is moved to the dotted line position. Upon return of the piston 43 to its normal position by the action of the coil spring 160 as previously described, the rotor of this latter valve V¹ also assumes the full line position thereof.

Compressed air is admitted to the slide valve V⁵ through the pipe sections *d*, *c*, and *j*, pilot valve V², pipe section *m* and reducing valve V³ thus causing movement of the valve member 202 across the cylinder 201, air being exhausted therefrom through the pipe section *k* and valve V².

The solenoids 132 are deenergized as the plunger 221 leaves the switch 218 and the stencil screen and squeegee assembly is accordingly lowered into decorating position in contact with the next tumbler T⁶.

Upon reaching its extreme position, the valve member V⁵ permits compressed air to be admitted to the cylinder 118 through the pipe sections *d* and *p*, slide valve V⁵, and pipe section *n*. The piston 119 is thus caused to move across the cylinder 118 immediately releasing the plunger 189 of the valve V⁴ and bleeding the entrapped air in the pipe section *f* to the atmosphere through the valve V. Movement of the piston 119 across the cylinder in the manner just indicated, operates through the pin and slot connection 124 to cause the stencil screen to be moved in its own plane, in a direction opposite to that previously described, to decorate the tumbler T⁶ during its tangential rolling line contact therewith.

When the valve member 202 has again assumed the position shown in Fig. 12, the end of the plunger 222 engages and closes the switch 216. Thus when the piston 118 reaches the end of its stroke and the actuating finger 219 closes the switch 215, the circuit through the conductor C, switch 215, conductors F and G, switch 216, conductors H and I, solenoids 132 and conductor J is completed, thus energizing the solenoids 132 and causing the stencil screen and squeegee assembly to be again elevated. The operator may then have access to the tumbler T⁶ on the rollers 81 as before.

The invention is susceptible to modification within the spirit and scope of the appended claims. For example, since the stencil screen assembly is mounted at the outer end of the relatively long radius arm 106, its movement in opposite directions follows a curve of relatively long radius of curvature, thus adapting the screen to stenciling operations upon tapered articles such as tumblers having tapered sides, bottles having tapered shoulders, etc. Such movement of the stencil screen has been referred to as an "oscillating" movement throughout the specification and claims. It is obvious however that where tumblers or bottles having straight parallel cylindrical sides are to be decorated, the stencil screen would be caused to "reciprocate" in a straight line over the surface of such articles. Therefore in the specification and claims the word "oscillate" and its derivatives are not to be so strictly construed as to limit movement of the stencil screen to an arcuate path. The broader interpretation which includes reciprocal movement of the screen in a straight line is intended.

We claim:

1. In an apparatus for decorating the curved surfaces of articles including a movable stencil screen and a squeegee therefor, a conveyor for articles to be decorated, means for periodically indexing said conveyor, a runway cooperating with said conveyor and adapted upon indexing of said conveyor to receive thereon successive articles issuing from said conveyor, an article support projecting upwardly in the path of movement of the articles on said runway and against which the foremost article is adapted to bear, means synchronized with said indexing means for periodically lowering and raising said article support below and above the level of said runway to permit the foremost article thereon to be received on said support and elevated thereby, and means synchronized with said indexing means for periodically removing the elevated articles from said support and for conveying the same to said stencil screen to be decorated.

2. In an apparatus for decorating the curved surfaces of articles including a movable stencil screen and a squeegee therefor, a conveyor for the articles to be decorated, means for periodically indexing said conveyor, a runway cooperating with said conveyor and adapted upon indexing of said conveyor to receive thereon successive articles issuing from said conveyor, an abutment positioned in the path of movement of said articles on said runway against which the foremost tumbler on said runway is adapted to bear, an article support cooperating with said runway and movable from a lowered position in alignment with said runway to an elevated position, means synchronized with said indexing means for periodically withdrawing said abutment from the path of movement of said articles on said runway while simultaneously lowering said support into alignment with said runway to permit said foremost article to be received thereon and for restoring said abutment while simultaneously elevating said support with the tumbler thereon, and means synchronized with said indexing means for periodically removing the elevated article from said support and for conveying the same to said stencil screen to be decorated.

3. In an apparatus for decorating the curved surfaces of articles including a movable stencil screen and a squeegee therefor, a runway adapted to receive thereon successive articles to be decorated, an article support projecting upwardly in the path of movement of the articles on said runway and against which the foremost article on said runway is adapted to bear, means for periodically lowering and raising said support below and above the level of said runway to permit the foremost article thereon to be received on said support and elevated thereby, and means synchronized with the movement of said support for removing the articles therefrom and for conveying the same to said stencil screen to be decorated.

4. In an apparatus for decorating the curved surfaces of articles including a movable screen and a squeegee therefor, means for receiving successive articles to be decorated in a cumbent position at a receiving station, means for successively elevating said articles from the receiving station to an intermediate position below the level of said stencil screen, and means synchronized with said elevating means for successively conveying said articles from said intermediate position to said stencil screen to be decorated.

5. In an apparatus for decorating the curved surfaces of articles including a movable screen and a squeegee therefor, means for receiving successive articles to be decorated in a cumbent position at a receiving station, a track upon which the articles are adapted to be moved from said receiving station to the stencil screen, means for periodically transferring successive articles at said receiving station to a position in alignment with said track, and means synchronized with said transferring means for impelling the thus aligned articles on said track to said stencil screen to be decorated.

6. In an apparatus for decorating the curved surfaces of articles including a movable screen and a squeegee therefor, means for receiving successive articles to be decorated in a cumbent position at a receiving station below the level of said screen, an upwardly extending track, the lower end of which terminates in a plane above the level of said receiving station and the upper end of which terminates adjacent said stencil screen, means for periodically transferring successive articles received at said receiving station to an intermediate position in alignment with the lower end of said track, and means synchronized with said transferring means for impelling the articles from said intermediate position on said track to said stencil screen to be decorated.

7. In an apparatus for decorating the curved surfaces of articles including a movable stencil screen and a squeegee therefor, means for receiving articles to be decorated in a cumbent position at a receiving station below the level of said screen, an article support including rollers upon which successive articles are adapted to be supported in tangential rolling line contact with said screen, said support being capable of swinging movement about a horizontal axis from an inverted position adjacent said receiving station to an upright position adjacent the screen, means for periodically elevating successive articles at said receiving station into contact with the inverted support, and means synchronized with said elevating means for periodically swinging said support with the article in contact therewith about said axis to an upright position with the article thereon in tangential rolling line contact with said screen.

8. In an apparatus for decorating the curved surfaces of articles including a movable stencil screen and a squeegee therefor, means for receiving articles to be decorated in a cumbent position at a receiving station below the level of said screen, an article support including rollers upon which successive articles are adapted to be supported in tangential rolling line contact with said screen, said support being capable of swinging movement about a horizontal axis from an inverted position adjacent said receiving station to an upright position adjacent the screen, means for periodically elevating successive articles at said receiving station into contact with said inverted support, an arcuate track extending from a point adjacent the support when in its inverted position to a position adjacent said screen, means carried by said support for impelling the elevated articles upwardly on said track into contact with said screen, and means synchronized with said elevating means for periodically swinging said support about said axis.

9. In an apparatus for decorating the curved surfaces of articles including a movable stencil screen and a squeegee therefor, means for receiving articles to be decorated in a cumbent position at a receiving station below the level of said screen, an arcuate track extending from a point in the vicinity of said receiving station upwardly to a point in the vicinity of said screen, means for successively aligning the articles received at said receiving station with the lower end of said track, and means synchronized with said aligning means for successively impelling the thus aligned articles upwardly on said track into contact with said screen.

10. In an apparatus for decorating the curved surfaces of articles including a movable stencil screen and a squeegee therefor, means for receiving articles to be decorated in a cumbent position at a receiving station below the level of said screen, an article support including rollers upon which successive articles are adapted to be supported in tangential rolling line contact with said screen, said support being capable of swinging movement about a horizontal axis from an inverted position adjacent said receiving station to an upright position adjacent the screen, means for periodically elevating successive articles at said receiving station into contact with the inverted support, means synchronized with said elevating means for periodically swinging said support about said axis, and means extending in the path of swinging movement of said support and between which means and the support the articles are adapted to be confined during the swinging movement of the former to elevate said articles with the support into contact with said stencil screen.

11. In a stenciling apparatus for decorating the curved surfaces of articles, comprising a stencil screen assembly including a horizontally oscillatable screen, means for positioning successive articles to be decorated against said screen with the curved surfaces thereof in tangential rolling line contact therewith, means for applying a decorating material through said screen to the respective surfaces of said articles upon oscillation of said screen, and means operable upon completion of each oscillation of the screen for tilting said stencil screen assembly about a horizontal axis to elevate said screen from contact with the respective surfaces of said articles.

12. In a stenciling apparatus for decorating the curved surfaces of articles, a stencil screen assembly including a horizontally oscillatable screen, means for positioning successive articles to be decorated against said screen with the curved surfaces thereof in tangential rolling line contact therewith, means for applying decorating material through said screen to the respective surfaces of said articles upon oscillation of said screen, and electromagnetic means for tilting said stencil screen assembly about a horizontal axis to elevate said screen from contact with the respective surfaces of said articles upon completion of each oscillation of the screen.

13. In a stenciling apparatus for decorating the curved surface of an article, a horizontally oscillatable stencil screen, means for positioning an article to be decorated against said screen with the curved surface thereof in tangential rolling line contact therewith, a cylinder having a piston reciprocable therein, means connecting said piston with the stencil screen, means for admitting motive fluid alternately to the opposite ends of said cylinder to oscillate the screen, and means actuated by movement of said piston for elevating said screen from contact with the surface of said article upon completion of each reciprocation of said stencil screen.

14. In a stenciling apparatus for repeatedly decorating the curved surfaces of successive articles, a horizontal oscillatable stencil screen and a squeegee therefor, a conveyor for articles to be decorated, a runway cooperating with the conveyor and adapted upon indexing of said conveyor to receive thereon successive articles issuing from said conveyor, a cylinder having a piston slidably mounted therein, an article support projecting upwardly in the path of movement of the articles on said runway and against which the foremost article is adapted to bear, means operable upon movement of said piston in one direction for indexing said conveyor, means operable upon such movement of said piston for lowering said article support below the level of said runway to permit the foremost article thereon to be received on said support and operable upon movement of said piston in the other direction for raising said article support together with the article thereon, means operable upon movement of said piston in said first direction for removing a previously elevated article from said support and for conveying the same to said stencil screen to be decorated, and means for actuating said piston.

15. In a stenciling apparatus for decorating the curved surfaces of articles, a horizontally oscillatable stencil screen and a squeegee therefor, a conveyor adapted to receive thereon the articles to be decorated, an article support cooperating with the conveyor and adapted upon indexing of the latter to receive thereon successive articles issuing from the conveyor, a cylinder having a piston slidably mounted thereon, means operable upon movement of said piston in one direction for indexing said conveyor, means also operable upon movement of said piston in the same direction for elevating an article on said support above the level thereof, means operable upon such movement of the piston for removing a previously elevated article from said support and for conveying the same to said screen to be decorated, and means for actuating said piston.

16. In a stenciling apparatus for decorating the curved surfaces of articles, an oscillatable stencil screen and a squeegee therefor, a cylinder having a piston reciprocable therein, means connecting said piston and screen whereby reciprocation of said piston in the cylinder will cause oscillation of said screen, and means for admitting motive fluid alternately to the opposite ends of said cylinder to reciprocate the piston therein.

17. In a stenciling apparatus for decorating the curved surfaces of articles, an oscillatable stencil screen and a squeegee therefor, a conveyor adapted to receive thereon the articles to be decorated, means for indexing said conveyor, a cylinder having a piston reciprocable therein, means connecting said piston and screen whereby reciprocation of said piston in the cylinder will cause oscillation of said screen, and means controlled by said indexing means for admitting motive fluid alternately to the opposite ends of said cylinder to reciprocate the piston therein.

18. In a stenciling apparatus for decorating the curved surfaces of articles, an oscillatable stencil screen and a squeegee therefor, a conveyor adapted to receive thereon the articles to be decorated, means for indexing said conveyor, means synchronized with said indexing means for transferring articles from said conveyor to said screen successively, and means also synchronized with said indexing means for oscillating said screen.

19. In a stenciling apparatus, a squeegee arm pivoted for swinging movement about a vertical axis, a stencil screen mounted on the outer free end of said arm, a cylinder having a piston mounted for reciprocation therein, a reciprocable rod connected to said piston for reciprocation therewith, a pin and slot connection between said rod and squeegee arm medially of the arm, and means for causing reciprocation of said piston in said cylinder.

HENRY W. SCHNEIDER.
LAWRENCE O. MANKIN.